Patented Oct. 17, 1939

2,176,444

UNITED STATES PATENT OFFICE 2,176,444

PROCESS OF PREPARING ALUMINATES

Hans Zirngibl, Bitterfeld, Germany, assignor to I. G. Farbenindustrie Aktiengesellschaft, Frankfort-on-the-Main, Germany No Drawing. Application July 2, 1938, Serial No. 217,310. In Germany July 10, 1937

5 Claims. (Cl. 23—52)

The present invention relates to a process for preparing aluminates.

Several processes are known in which, instead of a comparatively costly sodium carbonate, sodium sulfate and carbon are used in attacking bauxite or other aluminiferous minerals. None of these processes, however, has given a product without a substantial content of sodium sulfide, so that it has not been possible to obtain directly from the mass aluminate liquor free from iron, since sodium sulfide forms soluble double salts with the iron sulfide which is always present in the liquor. Inasmuch as it has been believed that in attacking clay with sulfuric acid and reducing with carbon the mixture of aluminium sulfate and sodium sulfate thus obtained, a mass free from sulfide could not be produced, the operations have always included a refining of the sodium sulfide in order to obtain this by crystallization. It is not possible in this manner to prevent the contamination of the aluminate liquors with iron. It has already been attempted to conduct the reactions in such a manner that the sulfur could be recovered as sulfur dioxide. In order to achieve this either iron sulfide or another sulfide or carbon in excess is added as reducing agent. It has been shown, however, that this process cannot be so conducted that merely sulfur dioxide is produced and the residue is free from sulfide and sulfate; rather there is always produced in addition to sulfur dioxide, sulfur and sulfuretted hydrogen, as well as sodium sulfide and sulfate. It has further been found that if the temperature is raised above 800 to 1000° C., the yield is unfavorable on account of the sintering produced. For the same reasons a mixture of alkaline earth sulfate and aluminium sulfate cannot be reduced with success.

The conclusion is that it has not hitherto been possible to produce a pure aluminium oxide from aluminiferous minerals or the aluminium sulfate obtained therefrom by admixture of alkali sulfate or alkaline earth sulfate and reduction and subsequent extraction of aluminate, particularly with the recovery of the sulfur in a satisfactory manner in the form of sulfur dioxide which is an important condition for the commercial prospect of the process.

The present invention is based on the observation that the foregoing difficulties can be minimized or avoided by conducting the reduction of the mixture of an aluminiferous mineral, for example bauxite, alunite, aluminium sulfate or aluminium sulfite with an alkali sulfate and/or an alkaline earth sulfate in stages without sintering at a temperature up to 1200 to 1300° C. For this purpose there are used known solid or liquid and/or gaseous or solid and liquid reducing agents, the material being brought into contact at a temperature above about 800 to 1000° C. with steam or carbon dioxide in addition to the reducing agent. Since it is essential to conduct the first part of the reduction at the lowest possible temperature, whereby as much as possible of the sulfur is simultaneously evolved directly in the form of $SO_2$, the material is heated in a first furnace zone up to about 600 to 700° C., in a second zone up to about 800 to 1000° C. and in a third zone up to about 1200 to 1300° C., the first zone being preferably slightly oxidizing, the second neutral when carbon is used and the third reducing.

When only gaseous reducing agents are used, they are applied in the second zone in deficiency in order to avoid a reduction of the sulfur dioxide formed. The final reduction should occur only at a temperature above 1000° C. in order to exclude formation of sodium sulfide as far as possible. If, in fact, the process is so conducted that practically only sulfur dioxide is formed, there is the further advantage that a formation of carbon oxy-sulfide or other contact poisons for the sulfuric acid process are excluded from the beginning. The supervision of the first oxidizing zone is thus simplified.

The proportion of C to $SO_4$ amounts to about 1:1 to 2, that is to say the carbon in the second zone is also in deficiency in order to cater for the formation of $SO_2$ as far as possible. The product consists up to a temperature of about 1000° C. for the greater part of alkali aluminate or alkaline earth aluminate. Since most of the sulfur has been expelled, the mass may now be heated to about 1200 to 1300° C. without danger of sintering, whereby with aid of steam or carbon dioxide a complete reaction with liberation of the residual sulfur is obtained. Any sulfuretted hydrogen produced is burnt to sulfur dioxide in the oxidizing zone.

In the mixture the ratio $Al_2O_3$ to $Na_2O$ or $CaO$ to C should be calculated on the following basis:

When a ratio $Al_2O_3:Na_2O=1:1$, practically 1:1.1 to 1.2 with respect to the iron- and titanium oxide, is used, the sodium aluminate produced is not completely soluble in water, since a portion of the aluminate is hydrolytically dissociated. In the leaching liquor, however, the whole of the alumina can be retained in solution. When alkaline earth sulfate is used, the ratio Al₂O₃:CaO=1:1 up to about 3, corresponds with the possible aluminates CaOAl₂O₃, 2CaOAl₂O₃, 3CaOAl₂O₃.

The proportion of carbon should preferably be between the values expressed by the following equations:

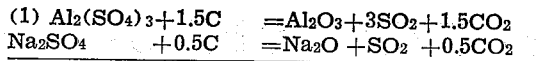
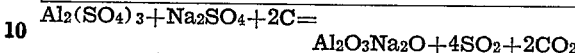
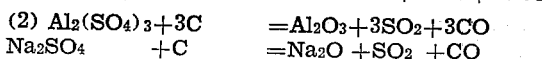
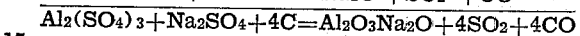

When a higher proportion Al₂O₃:Na₂O is used, correspondingly more carbon must, of course, be employed.

Al₂O₃:Na₂O:C=1:1:2 to 4
Al₂O₃:Na₂O:C=1:1.5:2.25 to 4.5 etc.

The kind of carbon used is also of certain importance; most suitable is clean coke, in which case about 90 to 95 per cent. of the total sulfur is produced directly in the form of SO₂. Any other kind of carbon, preferably poor in ash, may be used, and coal having a small quantity of gas is to be preferred.

The reducing furnace is preferably a rotary one with a gas-tight closure on one side and facility for introducing gas and air at various positions. Obviously, other furnaces, for instance shaft furnaces, may be used, if ducts are provided for gas and air at places corresponding with the conditions desired. The desired zones are formed in the furnace by corresponding regulation of gas and air supply.

In attacking a bauxite containing silica there is introduced into the mixture in known manner the quantity of CaO corresponding with the content of SiO₂, advantageously in the form of CaSO₄. The following examples illustrate the invention, the parts being by weight:—

*Example 1.*—A mixture of 342 parts of ferruginous aluminium sulfate (referred to as dry material), 142 parts of sodium sulfate and 30 parts of coke (85% C) is charged at the feed side of a rotary furnace heated by means of water gas. In the furnace there are formed by suitable regulation of the gas and air supply 3 zones, the positions of which are controlled by gas analysis. The first zone should be formed with a slight excess of air, the second should be neutral and the third should be kept freely reducing. The gases leaving the furnace may contain 10 per cent. of SO₂ and 1 per cent. of O₂, the rest being water vapor, carbon dioxide and nitrogen; other sulfur compounds should not be present in the issuing gases. The product is completely reduced, contains a small proportion of carbonate and the iron in the form of insoluble iron sulfide which in consequence of its pyrophoric property is converted in contact with air into iron oxide. The aluminate is treated in counter-current with a leaching liquor whereby a solution practically quite free from sulfide and iron is obtained. The working-up of the product to pure alumina and sodium carbonate or sodium hydroxide follows the known methods. The gases leaving the furnace are mixed with 40 to 50 per cent. of air and worked up to sulfuric acid by the contact process, which acid may be used for attacking a further batch of mineral. Instead of the water gas prescribed above there may be used hydrogen, illuminating gas, producer gas, coal dust or the like.

If in this example the final temperature is about 1200° C., sodium sulfate formed from iron sulfate must be expected as an impurity in the aluminate liquor. If, however, the temperature is raised to about 1300° C., even the sulfur of the iron sulfide is expelled, so that only iron oxide is present.

*Example 2.*—A mixture of 666 parts of ferruginous aluminium sulfate (Al₂(SO₄)₃, 18H₂O), 272 parts of calcium sulfate and 32 parts of gas coke is charged into a rotary furnace fired by coal dust. By suitable regulation of the gas and air supplies 3 zones (final temperature about 1300° C.) are formed, their position being controlled by gas analysis. The first zone is oxidizing, the second neutral and the third reducing. The gases leaving the furnace contain in addition to steam, carbon dioxide and nitrogen, about 10 per cent. of sulfur dioxide and 1 per cent. of oxygen. The calcium aluminate produced, which is sintered after the reduction, is practically quite free from sulfur and contains in addition to iron oxide only impurities due to the ash of the coke. The comminuted product is easily leached. It may be run while hot into a sodium carbonate solution. Preferably, an excess of about 100 per cent. of sodium carbonate is used and this may contain some sodium hydroxide and should be used in counter-current.

*Example 3.*—A mixture of 666 parts of ferruginous aluminium sulfate, 104 parts of calcium sulfate, 31.3 parts of sodium sulfate and 26 parts of coke may be treated in a manner corresponding with that described in Example 2.

The invention is not limited to the exact details described, for obvious modifications will occur to a person skilled in the art. As to the final reduction in the presence of steam and/or carbon dioxide I wish to be understood that usually a sufficient quantity already results from burning a part of the gaseous reducing agent for the interior heating of the furnace.

What I claim is:

1. The process of preparing aluminates which comprises directly heating a mixture of a member of the group consisting of bauxite, alunite, aluminium sulfate, aluminium sulfite with a member of the group consisting of alkali and alkaline earth sulfates in an oxidizing atmosphere to about 600 to about 700° C. and reducing the mixture in steps without sintering at a temperature up to about 1200 to about 1300° C., the chief reduction being carried out below about 1000° C. with an undercharge of the reducing agent, the final reduction being carried out only with a gaseous reduction agent in the presence of a member of the group consisting of steam and carbon dioxide.

2. The process of preparing aluminates which comprises directly heating a mixture of aluminium sulfate and sodium sulfate, the ratio between Al₂O₃ and Na₂O being about 1:1, in an oxidizing atmosphere to about 600 to about 700° C. and reducing the mixture in steps without sintering at a temperature up to about 1200 to about 1300° C., the chief reduction being carried out below about 1000° C. with an undercharge of the reducing agent, the final reduction being carried out only with a gaseous reduction agent in the presence of a member of the group consisting of steam and carbon dioxide.

3. The process of preparing aluminates which comprises directly heating a mixture of aluminium sulfate and calcium sulfate, the ratio between Al₂O₃ and CaO being 1:1 to 3, in an oxidizing atmosphere to about 600 to about 700° C. and reducing the mixture in steps without sintering at a temperature up to about 1200 to about 1300° C., the chief reduction being carried out below about 1000° C. with an undercharge of the reducing agent, the final reduction being carried out only with a gaseous reduction agent in the presence of a member of the group consisting of steam and carbon dioxide.

4. The process of preparing aluminates which comprises directly heating a mixture of a member of the group consisting of bauxite, alunite, aluminium sulfate, aluminium sulfite with sodium sulfate and calcium sulfate, in an oxidizing atmosphere to about 600 to about 700° C. and reducing the mixture in steps without sintering at a temperature up to about 1200 to about 1300° C., the chief reduction being carried out below about 1000° with an undercharge of the reducing agent, the final reduction being carried out only with a gaseous reduction agent in the presence of a member of the group consisting of steam and carbon dioxide.

5. The process of preparing aluminates which comprises directly heating a mixture of aluminium sulfate, sodium sulfate and calcium sulfate, in an oxidizing atmosphere to about 600 to about 700° C. and reducing the mixture in steps without sintering at a temperature up to about 1200 to about 1300° C., the chief reduction being carried out below about 1000° C. with an undercharge of the reducing agent, the final reduction being carried out only with a gaseous reduction agent in the presence of a member of the group consisting of steam and carbon dioxide.

HANS ZIRNGIBL.